Figure 1:
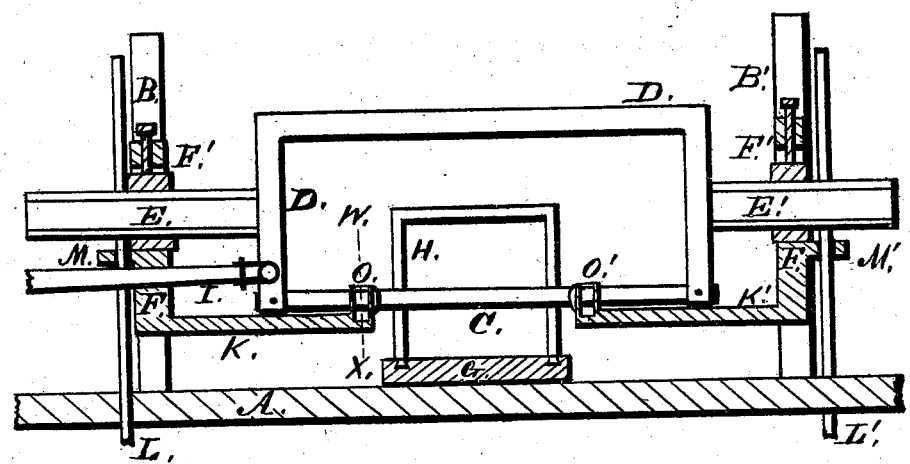

F. QUINN.
Candy-Cutters.

No. 143,590. Patented Oct. 14, 1873.

Witness:
F. M. Tate,
S. T. Marshall,

Inventor:
Francis Quinn.
By Saml. J. Wallace,
Attorney,

UNITED STATES PATENT OFFICE.

FRANCIS QUINN, OF KEOKUK, IOWA.

IMPROVEMENT IN CANDY-CUTTERS.

Specification forming part of Letters Patent No. 143,590, dated October 14, 1873; application filed August 13, 1873.

*To all whom it may concern:*

Be it known that I, FRANCIS QUINN, of Keokuk, Lee county, Iowa, have invented an Improvement in Candy-Cutters, of which the following is a specification:

This invention is an improvement in the candy-cutter patented to FRANCIS QUINN, October 1, 1872, and relates to some of the details therein, which are made as set forth hereinafter, referring to the drawings, in which—

Figure 2:
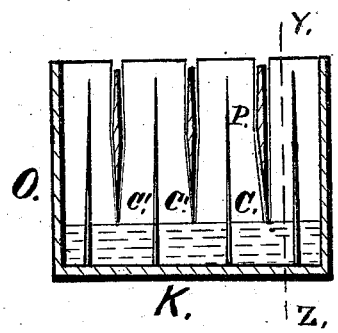

Figure 1 is a sectional side view of a portion of the machine, and Fig 2 a cross-section of a portion of same on line W X, Fig. 1.

The general arrangement of the machine is similar to that in the patent referred to. The operating parts are mounted on a main frame, A, which has two pairs of uprights, B, to hold the cutter-frame gates. The cutters C C', which may be one, two, or more in number, are hung in a frame, D, and are arranged a suitable distance apart to cut slices of the thickness desired. This frame D has end bars E E' to guide its movements. These pass through bearings in gates F at each end. These bearings have V-shaped bevel bearing-surfaces at top and bottom to give steadiness to the motion; and the top part F' has a set-screw to adjust its pressure. The gates F have guide-surfaces at each side fitted against the upright parts that hold them, so that they can freely rise and fall with the cutter-frame at work, and be held in place. The gates, with the cutters, are raised and fed down in cutting by screws at each gate. These screws are made to act together by a shaft underneath, having bevel-wheels gearing with bevel-wheels on each screw-shaft. The knife next to the lump of candy being cut is flat on the side next to the mass. The other side being shaped so, the cutter is thin on one or both edges, and thick in the middle for strength, the other knife or knives being beveled on both sides, so as to make both edges thin. There is a slot through the gate at one end, so as to let the driving-pitman I pass from the driving-crank to a wrist on the cutter-frame near the end of the cutters.

The candy to be cut is put on a board, G, which is fed crosswise under the knives by a screw or other means as the candy is cut. This has a box, H, to fit over the candy and hold it in place. The bottom edges of this box are made dovetailed, and fitted to run in grooves in the board G, so as to slide back as the board is fed up to the knives. Each gate has a part projecting from it toward the place of the candy to be cut, K. This bears a box, O, which has a slot cut in it to pass each knife; and the side of the box next to the candy has ivory scrapers to fit the knife as it comes from the candy, and scrape off any candy that may stick to it. These scrapers are arranged to fit tight by spring-pressure or otherwise. Back of the scrapers the boxes have sponges or other suitable substance saturated with oil, and arranged to oil both sides of each knife, to lubricate it in cutting, and keep the candy from sticking. The boxes have upright rods through the sponge to hold it in place.

I claim—

1. The candy-cutter having cutters C C set in one reciprocating frame, D, and having feed-board G, with its cover H fitted to it, to slide in grooves, all substantially as set forth.

2. The candy-cutter, having knives with both sides beveled to make the front and back thin and the center thicker.

3. The candy-cutter with each knife passing through oil-boxes or oilers to lubricate it.

FRANCIS QUINN.

Witnesses:
SAML. J. WALLACE,
R. M. MARSHALL.